United States Patent
Uhl

(10) Patent No.: US 9,594,728 B2
(45) Date of Patent: Mar. 14, 2017

(54) DEVICE AND METHOD FOR DETERMINING AN ESTIMATE OF THE LOGARITHM OF AN INPUT VARIABLE

(71) Applicant: Robert Bosch GmbH, Stuttgart (DE)

(72) Inventor: Alexander Uhl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 14/596,251

(22) Filed: Jan. 14, 2015

(65) Prior Publication Data

US 2015/0199303 A1    Jul. 16, 2015

(30) Foreign Application Priority Data

Jan. 14, 2014    (DE) .................. 10 2014 200 465

(51) Int. Cl.
  *G06F 1/02*    (2006.01)
  *G06F 17/18*    (2006.01)
  *G06F 5/01*    (2006.01)
  *G06F 7/556*    (2006.01)

(52) U.S. Cl.
  CPC ............... *G06F 17/18* (2013.01); *G06F 5/01* (2013.01); *G06F 7/556* (2013.01)

(58) Field of Classification Search
  CPC ............ G06F 17/18; G06F 5/01; G06F 7/556
  USPC ........................................ 708/209, 277, 517
  See application file for complete search history.

(56) References Cited

U.S. PATENT DOCUMENTS

| | | | | |
|---|---|---|---|---|
| 5,604,691 A * | 2/1997 | Dworkin | .............. | G06F 1/0307 341/75 |
| 5,642,305 A * | 6/1997 | Pan | .................. | G06F 1/0356 341/75 |
| 5,801,974 A * | 9/1998 | Park | .................. | G06F 7/556 708/277 |
| 6,711,601 B2 * | 3/2004 | Inoue | .................... | G06F 1/035 708/277 |
| 7,509,363 B2 * | 3/2009 | Clifton | .................. | G06F 1/0356 708/272 |
| 7,539,717 B2 * | 5/2009 | Hussain | .............. | G06F 1/0307 708/277 |
| 2003/0014453 A1 * | 1/2003 | Challa | .................. | G06F 7/5235 708/277 |

OTHER PUBLICATIONS

Mitchell, J. N., "Computer Multiplication and Division Using Binary Logarithms", IRE Transactions on Electronic Computers, 1962, EC-11, pp. 512-517.

* cited by examiner

*Primary Examiner* — Tan V. Mai
(74) *Attorney, Agent, or Firm* — Moginot, Moore & Beck LLP

(57) ABSTRACT

The disclosure relates to a device for determining an estimate of the logarithm of an input variable. The device has an approximation unit which is designed to use an approximation to determine from the input variable a first variable that corresponds to the integer component of the logarithmic value of the input variable. The approximation unit is further designed to determine a second variable which corresponds to an estimate of a non-integer component of the logarithmic value of the input variable. The device further comprises a determination unit for determining a correcting quantity by using the second variable; and an assessment unit for assessing the estimate of the logarithm of the input variable by combining the first variable with the second variable and the correcting quantity.

8 Claims, 5 Drawing Sheets

DEVICE AND METHOD FOR DETERMINING AN ESTIMATE OF THE LOGARITHM OF AN INPUT VARIABLE

This application claims priority under 35 U.S.C. §119 to application no. DE 10 2014 200 465.9, filed on Jan. 14, 2014 in Germany, the disclosure of which is incorporated herein by reference in its entirety.

BACKGROUND

The present disclosure relates to a device for determining an estimate of the logarithm of an input variable, to a corresponding method and to a corresponding computer program product.

The calculation of the logarithmic function has been available since approximately 1990 in many floating point processors as an installed hardware function, and is usually accomplished by an integrated floating point coprocessor. Alternatively, the logarithmic calculation is performed by software (so-called floating point emulation), and this naturally takes place much more slowly. It is usual here to use iterative methods which require a plurality of steps to calculate the logarithm.

Likewise to be found in fixed point arithmetic are methods which calculate the logarithm in a plurality of steps, or else calculate the logarithm in one step. Methods which calculate the logarithm in one step mostly have a stipulated accuracy of the calculation and cannot be adapted to any desired accuracy.

The scientific publication by Mitchell, J. N., "Computer Multiplication and Division Using Binary Logarithms", IRE Transactions on Electronic Computers, 1962, EC-11, 517 describes in this context an algorithm for electronic calculation of logarithms in electronic processors.

SUMMARY

Against this background, the approach presented here proposes a device for determining an estimate of the logarithm of an input variable, furthermore a corresponding method and, finally, a corresponding computer program product according to the disclosure.

Advantageous refinements emerge from the respective embodiments and the following description.

The approach presented here provides a device for determining an estimate of the logarithm of an input variable, the device having the following features:

an approximation unit which is designed to determine from the input variable a first variable which corresponds to the integer component of the logarithmic value of the input variable, the approximation unit further being designed to determine a second variable which corresponds to an estimate of a non-integer component of the logarithmic value of the input variable;

a determination unit for determining a correcting quantity by using the second variable; and an assessment unit for assessing the estimate of the logarithm of the input variable by combining the first variable with the second variable and the correcting quantity.

A device may be understood here as an electrical apparatus which processes sensor signals or data signals and outputs control signals and/or data signals in dependence thereon. The device can have an interface which can be of hardware and/or software design. In the case of a hardware design, the interfaces can, for example, be part of a so-called system ASIC which includes very diverse functions of the device. However, it is also possible for the interfaces to be dedicated, integrated circuits, or to consist at least in part of discrete components. In the case of a software design, the interfaces can be software modules which are present, for example, on a microcontroller next to other software modules.

An approximation unit can be understood as a unit or circuit which is capable of determining a first and a second variable whose combination approximates the logarithm of the input variable. To this extent, the approximation unit offers a possibility of forming an approximation value for the logarithm of the input variable from the first and second variables. The first variable can in this case be stipulated in such a way that, upon use as an integer exponent of a base number, it represents the nearest power which is smaller than the input variable. The second variable can in this case be stipulated in such a way that the product from this nearest power, which is less than the input variable, and the sum of the number 1 with the second variable yields the input variable. A correcting quantity can be understood as a value of a variable which can be used to assess a more accurate estimate of the logarithm of the input variable than the estimate of the logarithm of the input variable which can be determined by the combination of the first and second variables provided by the approximation unit. A combination of the first variable with the second variable and the correcting quantity can be understood as an algebraic combination, in particular an addition, of said variables.

The approach proposed here is based on the finding that in order to improve or increase the accuracy of the estimate of the logarithm of the input variable it is possible to combine the first and second variables with a correcting quantity which is based on the second variable. Since, in particular, the second variable already represents or shows an estimate of a component of the logarithmic value of the input variable, it is possible to reduce an estimation error of the logarithm of the input variable in the approximation unit by further use of the second variable for determining the correcting quantity.

The approach proposed here offers the advantage that an approach already available can be further used to determine the estimate of the logarithm of the input variable, however, the result of the estimate of the logarithm of the input variable can be much improved by measures to be realized in a technically simple fashion. The structure required for implementing the approach proposed here in the device for determining the estimate of the logarithm of an input variable can therefore be implemented by circuitry or numerically, in order to obtain a very accurate estimate of the logarithm of the input variable with a very short processing time.

Particularly advantageous is an embodiment of the present disclosure in which the approximation unit is designed to use a Mitchell approximation to determine the first variable and/or to use the value two as base number to determine the first variable, and/or the approximation unit being designed in order to determine as second variable a value in the interval from zero to one. Such an embodiment of the present disclosure offers the advantage of a technically mature solution for determining a coarse estimate for the logarithm of the input variable from the variables supplied by the approximation unit and/or a technically very simple implementation to determine the first and second variable, in particular when use is made of a hardware structure for determining the first and/or second variables.

Also advantageous is an embodiment of the present disclosure in which the determination unit is designed to determine the correcting quantity by using a multiplication of a constant by a factor dependent on the second variable, in particular that the determination unit is designed to determine the factor by using a multiplexer and/or an inverter. Such an embodiment of the present disclosure offers the advantage of a technically very simple possibility for implementing the approach proposed here, although a significant improvement of the estimate of the logarithm of the input variable is rendered possible by contrast with conventional approaches.

In particular, when an implementation of the approach proposed here is attempted in a hardware structure, there is one very advantageous embodiment of the present disclosure in which the estimation unit is designed to use shift-and-add operations to determine the correcting quantity.

Again, in accordance with a further embodiment of the present disclosure the determination unit is designed to use a digit position and/or a bit of the second variable to determine the correcting quantity, in particular the digit position or the bit of the second variable representing the most significant digit position or the most significant bit of the second variable. Again, such an embodiment of the present disclosure offers the advantage of a technically very simple implementation of the approach proposed here. At the same time, said embodiment of the present disclosure offers the further advantage that the correcting quantity can be provided in a very short processing time, and thus very quickly, as a result of which the execution time for determining the estimate of the logarithm of the input variable can be kept very short.

The estimate of the logarithm of the input variable can also be determined particularly quickly when, in accordance with another embodiment of the present disclosure, the determination unit is designed to determine a first term dependent on the second variable as correcting quantity when the second variable is less than a threshold, and to determine a second term dependent on the second variable as correcting quantity when the second variable is greater than a threshold. In particular, here the use of the threshold decision with a very short processing time is particularly advantageous.

Furthermore, in accordance with one embodiment of the present disclosure the determination unit can also be designed to provide at least one second correcting quantity which is dependent on the second variable, the assessment unit being designed to assess the estimate of the logarithm of the input variable by combining the first variable with the second variable and the correcting quantity, and/or to assess the second correcting quantity. Such an embodiment of the present disclosure offers the additional advantage of also further being able to reduce estimation errors which still remain when taking account of the (first) correcting quantity.

Furthermore, it is possible to conceive one embodiment of the present disclosure in which the determination unit is designed to determine the second correcting quantity as a combination of a factor dependent on the second variable and at least one second constant, in particular to determine the second correcting quantity as a function of a third constant. In particular, at least the second constant can be used with a factor dependent on the second variable to implement a technically very simple possibility, which is at the same time quick to execute to determine the second correcting quantity.

Again, in accordance with one embodiment of the present disclosure the determination unit can be designed to determine the second correcting quantity at least as a function of a digit position of second-most significance and/or of a bit of second-most significance of the second variable. Such an embodiment of the present disclosure offers the advantage of a possibility which is technically very simple to implement and at the same time very quick to execute in order to determine the second correcting quantity.

As already stated previously, the use of a threshold decision can be a structure, which is easy to implement and at the same time quick to execute, for assessing the correcting quantity, it likewise being possible to use this structure, or a similar one, for an advantageous assessment of the second correcting quantity. To this extent, one embodiment of the present disclosure in which the estimation unit is designed to determine the second correcting variable as a function of the second variable and at least of a second threshold decision is particularly advantageous.

It is particularly advantageous to use an embodiment of the disclosure to validate the results of the digital multipliers. For this purpose, the disclosure is used to calculate an estimate respectively for the two operands of the multiplication and the result of the multiplication. The sum of the estimates of the logarithms of the two operands must correspond approximately to the estimate of the logarithm of the result of the multiplication. The difference between the addition of the estimates of the logarithms of the two operands and the estimate of the logarithm of the result of the multiplication thus constitutes an error signal which has a value of approximately zero in the case when the multiplier operates correctly. By comparing the error signal with an upper and a lower limit, it is possible, for example, to ensure that the multiplication result is correct to +/−5%. It is possible in dependence on said error signal to put a signal processing device which uses a multiplier given the occurrence of an error into a secure state or, for example, to execute a reset or to repeat the multiplication.

The error signal can signal correct behavior of the multiplier to downstream processing units. Similarly, one embodiment of the disclosure can be used to protect division.

The approach presented here is also used to present a signal processing device having the following features:
  a read in interface for reading in a signal which represents a physical variable;
  a device according to a variant presented here which is designed to process the physical variable or a value derived from the physical variable as input variable; and
  a control and/or signaling unit which is designed to use the estimate to provide a control signal and/or a data signal.

Here, the read in interface can read in the signal representing the physical variable from a sensor. In this case, a physical variable can be understood as a measured voltage, a measured current, a measured pressure, a measured acceleration or a different variable which can be detected by means of a sensor and is displayed in a corresponding signal. Again, in one embodiment of the device presented here the sensor itself can be part of the signal processing device. It is, for example, possible to conceive of using an embodiment of the present disclosure in microprocessors which compute in the logarithmic domain (for example European Logarithmic Microprocessor). Again, one embodiment of the present disclosure can be used for filter calculation, specifically to calculate the absolute value of vectors, for example. Such exemplary embodiments of the present disclosure likewise offer the advantage that signals and/or data can be processed on the basis of the physical variable in a fashion that is quick and easy in terms of circuitry and/or numerically and at the same time cost effectively.

Again, the approach presented here provides a method for determining an estimate of the logarithm of an input variable, the method having the following steps:

approximation of a first variable from the input variable, the first variable corresponding to the integer component of the logarithmic value of the input variable, there being approximated a second variable, which corresponds to an estimate of a non-integer component of the logarithmic value of the input variable;

using the second variable to determine a correcting quantity; and assessing the estimate of the logarithm of the input variable by combining the first variable with the second variable and the correcting quantity.

Again, such a method can be used to implement the approach presented here in a technical fashion that can be executed simply and quickly.

The variants of the device presented above for determining an estimate of the logarithm of an input variable can thus be understood as variants of a device which is designed to carry out or implement the steps of a variant of a method presented here in corresponding devices. Again, said variant embodiment of the disclosure in the form of a device can be used to achieve the object on which the disclosure is based in a fast and efficient fashion.

A further advantage is a computer program product with program code which can be stored on a machine readable carrier such as a semiconductor memory, a hard disk memory or an optical memory, and is used to carry out the method according to one of the embodiments described above when the program product is executed on a computer or a device.

BRIEF DESCRIPTION OF THE DRAWINGS

Exemplary embodiments of the disclosure are presented in the drawings and are explained in more detail in the description below.

In the drawings.

DETAILED DESCRIPTION

In the following description of favorable exemplary embodiments of the present disclosure, identical or similar reference symbols are used for the elements represented in the various figures and acting similarly, said elements not being repeatedly described.

A simple method for calculating logarithms to the base 2 (Logarithmus Dualis) is the above named so-called Mitchell approximation (it is described below) since it forms a starting point of an exemplary embodiment of the disclosure.

The point of departure below is that the input value x (also denoted as input variable x) is a real number and that the condition x>0 is fulfilled, that is to say it holds for the definition set D that:

$$D := \{x \in \mathfrak{R} \mid x > 0\} \tag{1}$$

The idea of the Mitchell approximation consists in representing the number x as a product of two factors. The first factor is the nearest 2nd power which is less than or equal to x, which means that the second factor is a number in the right-open interval [1,2). It therefore holds that:

$$x = 2^k \cdot \underbrace{(1 + f)}_{x_{cond}} \text{ where } 0 \leq f < 1 \tag{2}$$

The Logarithmus Dualis (ld) of said representation with two factors can be calculated in the following way:

$$ld(x) = ld(2^k \cdot (1+f)) = ld(2^k) + ld(1+f) = k + ld(1+f) \tag{3}$$

The Mitchell approximation provides for calculating the ld for the term (1+f) in the following way:

$$ld(x_{norm}) = ld(1+f) \approx f \tag{4}$$

It is therefore possible to calculate the ld(x) in an approximative fashion:

$$ld(x) \approx k + f \tag{5}$$

In formula (5), k forms the integer component of the ld(x), and f forms the non-integer fractional component of the ld(x).

In order to implement the calculation represented above in digital hardware, it is possible to use a circuit which normalizes the input value x such that the result $x_{norm}$ lies in the right-open interval [1,2). For this purpose, the input value x is divided by 2 until the result is a value in the interval [1,2). The number of divisions required for this purpose corresponds to the unknown value k from equation (5).

Divisions by 2 can easily be implemented by right-shift operations of the data word. A digital circuit which uses the Mitchell approximation for the ld(x) calculation must therefore carry out the following steps:

1.) carry out normalization (determine k according to (2))
2.) determine ld of the normalized word $x_{norm}$ according to equation (4)
3.) add the two values (see equation (5)).

There are efficient digital, combinatory circuits which use the Mitchell approximation for ld calculation.

Figure 1:
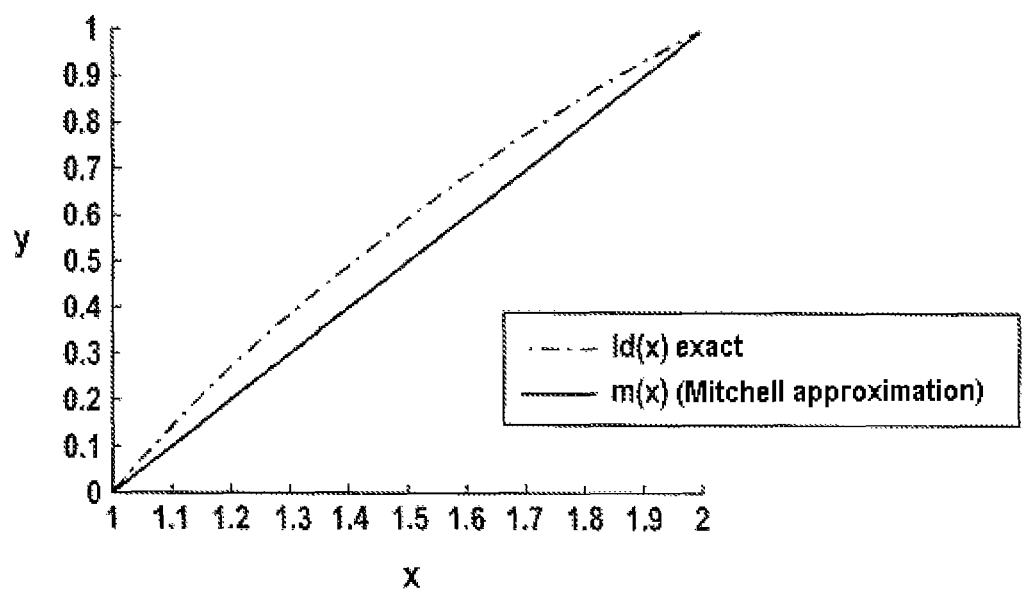
FIG. 1 shows a diagram of a comparison between the Mitchell approximation of the input variable and the exact calculated value of the ld(x)

FIG. 1 shows a diagram of a comparison between the Mitchell approximation of the input variable x (denoted in the further discussion by m(x)) and the exact calculated value of the ld(x). In this case, the diagram from FIG. 1 represents on the abscissa the input variable x in the interval from 1 to 2, and on the ordinate the exactly calculated ld(x) and the value of the Mitchell approximation m(x). Here, FIG. 1 reproduces the exact calculated value of the ld(x) on the dashed line, and the value of the Mitchell approximation of the input variable x is reproduced on the unbroken line.

Proceeding on this basis, the approach presented further in different exemplary embodiments presents a possibility for providing a method and a circuit for quick and simple calculation of function values of the logarithmic function to the base 2 (Logarithmus Dualis) in a few steps or one step.

Logarithms to other bases b (for example to the base b=e or to the base b=10) can therefore be implemented likewise since, according to equation (6), they differ from the ld(x) only by a constant factor.

$$\log_b(x) = \frac{1}{ld(b)} \cdot ld(x) \quad (6)$$

To this extent, the aim is to use the approach presented here to propose a method and a circuit for optimized calculation of a (desired) logarithm (an input variable).

The advantage of the approach proposed here consists in the simple implementability in digital hardware, for example, and/or in the possibility of adapting the accuracy of the calculation to the requirements of the application, and when so doing calculating the result in a few steps or one step. It is true that other methods offer the possibility of adapting the accuracy to the requirements, but they calculate the Logarithmus Dualis not of a small number of steps, nor in one step. An example of this is the BKM algorithm.

Methods which, by contrast, calculate the Logarithmus Dualis in a few steps or in one step mostly offer no possibility of increasing the accuracy at will.

Since the Mitchell approximation is a very inaccurate approximation method for calculating the ld(x), accordingly large errors are made by using said approximation method.

An idea of the approach presented here can be seen in a special way of compensating the errors of the Mitchell approximation by adding at least one further correction term.

Figure 2:
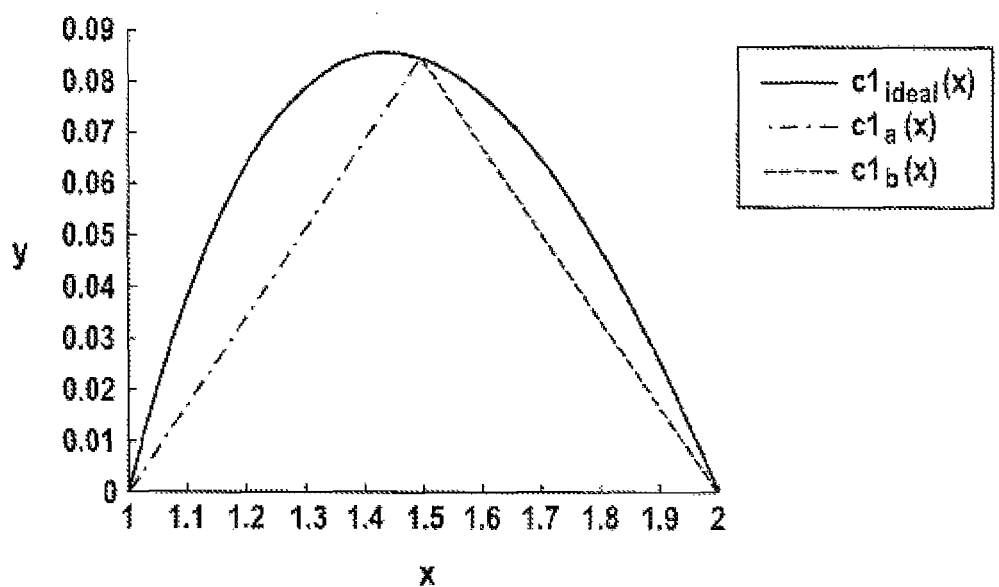
FIG. 2 shows a diagram of an ideal correction function which corrects an error between the Mitchell approximation of the input variable and the exact calculated value of the ld(x), it being possible to approximate said correction function by straight lines.

The ideal correction function $c1_{ideal}(x)$ is illustrated in a diagram in FIG. 2. Here (in accordance with the diagram from FIG. 1) the input variable x is once again represented on the abscissa in the interval from 1 to 2. FIG. 2 in this case illustrates the ideal correction function $c1_{ideal}(x)$ (as unbroken line) and the two straight lines $c1_a(x)$ (as dashed and dotted line) and $c1_b(x)$ (as dashed line).

If the function values of said function $c1_{ideal}(x)$ are added to those of the Mitchell approximation m(x), the result of the exact calculation of the ld(x), as represented in formula (7).

$$ld(x) = m(x) + c1_{ideal}(x) \quad (7)$$

In order to approximate said ideal correction function $c1_{ideal}(x)$ as simply as possible, said function is approximated by two straight lines by way of example (said procedure is denoted below as first-order approximation). The two straight lines pass respectively through one of the two zero points of the ideal correction function $c1_{ideal}(x)$ and intersect at a point on $c1_{ideal}(x)$. The x-coordinate of the point of intersection is selected in the middle of the two zero points (that is to say, at x=1.5). The y-coordinate of the point of intersection is the function value of $c1_{ideal}(x)$ at said point (that is to say $c1_{ideal}(1.5)$). For x in the interval [1.0, 1.5), the straight line $c1_a(x)$ is therefore determined by the point (1.0) and the point (1.50, $c1_{ideal}(1.5)$). For x in the interval [1.5, 2.0), the straight line $c1_b(x)$ is therefore determined by the point (1.50, $c1_{ideal}(1.5)$) and the point (2.0). The absolute value of the gradients of the two straight lines is therefore identical. The following two correction terms are yielded for the two ranges:

$$c1_a(x) = 2 \cdot c1_{ideal}(1.5) \cdot (x-1) = k1 \cdot (x-1) \text{ for } x \in [1.0, 1.5) \quad (8)$$

$$c1_b(x) = 2 \cdot c1_{ideal}(1.5) \cdot (2-x) = k1 \cdot (2-x) \text{ for } x \in [1.5, 2.0)$$

The first-order approximation for the ld(x) is therefore:

$$ld(x) \approx m(x) + c1_a(x) \text{ for } x \in [1.0, 1.5) \quad (9)$$

$$ld(x) \approx m(x) + c1_b(x) \text{ for } x \in [1.5, 2.0)$$

Figure 3:
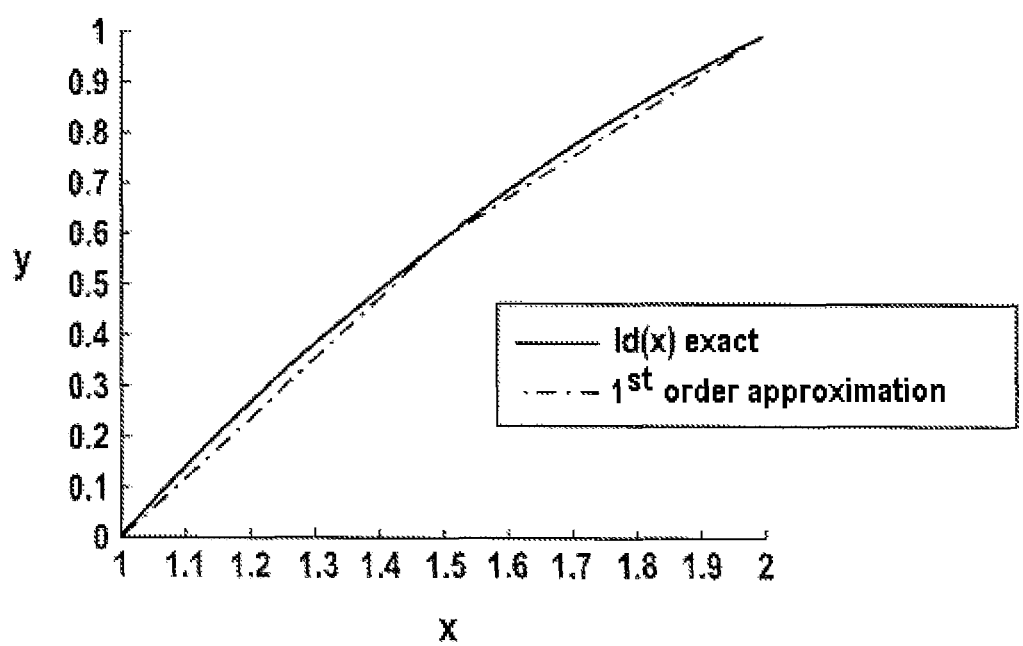
FIG. 3 shows a diagram which reproduces a comparison between the exact calculation of the ld(x) and the first-order approximation.

FIG. 3 shows a diagram which reproduces (with a designation of the axes corresponding to FIG. 1 or 2) a comparison between the exact calculation of the ld(x) (unbroken line) and the first-order approximation (dashed and dotted line).

The first-order approximation is therefore substantially more accurate than the Mitchell approximation. It is, however, not exact.

Figure 4:
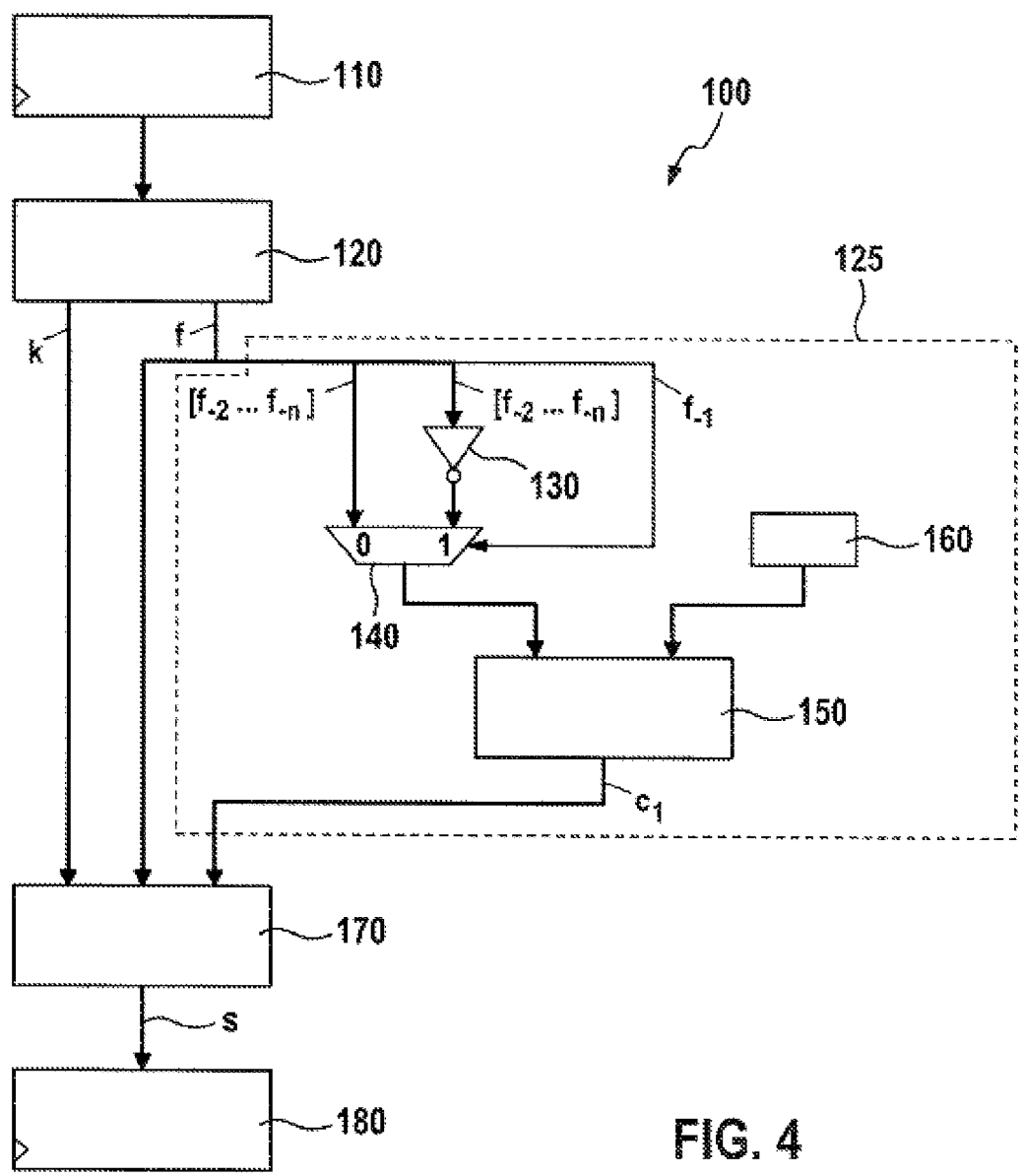
FIG. 4 shows a circuit diagram of an exemplary embodiment of a device for determining an estimate of the logarithm of an input variable.

FIG. 4 shows a circuit diagram of an exemplary embodiment of a device 100 for determining an estimate s of the logarithm of an input variable x, said device 100 being understood as arrangement for calculating the first-order approximation. It is thereby possible to implement the formula (9) in hardware, for example.

The device 100 comprises a register 110 which includes the value x (that is to say the input variable) of which the logarithm (ld) is to be determined. The Mitchell approximation, for example, is determined for this value by means of the approximation unit 120. In this case, the approximation unit 120 supplies as first variable the value k which corresponds to the integer component of the logarithm value of the input variable. Furthermore, the approximation unit 120 supplies as second variable the value f which (in accordance with the foregoing description) corresponds to an estimate of a non-integer component of the logarithmic value of the input variable. As data word k, the first variable comprises the bits which represent the integer portion of the ld. As data word f, the second variable comprises the bits which form the fractional portion of the ld(x).

$$k = [k_{m-1} \ldots k_1 k_0] = k_{m-1} \cdot 2^{m-1} + \ldots + k_1 \cdot 2^1 + k_0 \cdot 2^0 \quad (10)$$

$$f = [f_{-1} \ldots f_{-(n-1)} f_{-n}] = f_{-1} \cdot 2^{-1} + \ldots + f_{-(n-1)} \cdot 2^{-(n-1)} + f_{-n} \cdot 2^{-n}$$

Circuits for implementing the approximation unit 120 which calculate the Mitchell approximation are known and can be implemented here, for example, using combinatorial logic.

Furthermore, the device 100 comprises a determination unit 125 for determining the correcting quantity c1. As signal to be processed, said determination unit 125 receives the second variable f and determines the correcting quantity by using said second variable or individual components or symbols from the second variable. The determination unit 125 has an inverter 130 and a multiplexer 140 which are used to implement the terms (x−1) and (2−x) from equation (8) and the selection of the correct terms depending on the value of x. The multiplexer 140 is controlled by bit $f_{-1}$ (significance $2^{-1}$) of the data word f. The components $[f_{-2} \ldots f_n]$ of the second variable are applied to a first input of the multiplexer 140, while the components $[f_{-2} \ldots f_{-n}]$ of the second variable are likewise applied to the input of the inverter 130. The output of the inverter 130 is connected to the second input of the multiplexer 140. Since the relationship $x_{norm} = 1 + f$ exists between the normalized word $x_{norm}$ and the data word f, it is sufficient to consider the bit $f_{-1}$ to decide whether straight line $c1_a(x)$ or $c1_b(x)$ should be used for compensation (see formula (8)).

$$\text{use } f_{-1} = 0 \rightarrow c1_a(x) \quad (11)$$

$$\text{use } f_{-1} = 1 \rightarrow c1_b(x)$$

Both functions $c1_a(x)$ and $c1_b(x)$ consist, for example, of a multiplication of a constant value $k1=0.170$ by a variable term $(x-1)$ or $(2-x)$. Since the factor $k1$ is constant, said multiplication can be implemented, for example, efficiently with a shift-and-add structure. The term $(x-1)$ in $c1_a(x)$ may be expressed by f:

$$(x-1)=f \quad (12)$$

It holds for the term $(2-x)$ in $c1_b(x)$ that:

$$(2-x)=(2-(1+f))=(1-f) \quad (13)$$

A simple but very accurate approximation can be specified for implementing the term $(1-f)$ in hardware. For this purpose, the data word f is represented in formula (14) in two's complement in fixed point representation, the integer part is expanded with zeros. The point in formula (14) marks the radix point (corresponding to a decimal point).

$$f=[0 \ldots 0 \; 0.f_{-1} \ldots f_{-(n-1)}f_{-n}] \quad (14)$$

$$=0 \cdot (-2)^{m-1}+0 \cdot 2^{m-2}+ \ldots +0 \cdot 2^0+f_{-1} \cdot 2^{-1}+ \ldots + f_{-(n-1)} \cdot 2^{-(n-1)}+f_{-n} \cdot 2^{-n}$$

An approximation for the term $(1-f)$ can be specified by calculating the term in the two's complement:

$$1-f = \underbrace{[0 \ldots 01.0 \ldots 00]}_{1} + \quad (15)$$

$$\underbrace{[1 \ldots 11.\bar{f}_{-1} \ldots \bar{f}_{-(n-1)}\bar{f}_{-n}] + [0 \ldots 00.0 \ldots 01]}_{-f} \approx$$

$$\underbrace{[0 \ldots 01.0 \ldots 00]}_{1} + \underbrace{[1 \ldots 11.\bar{f}_{-1} \ldots \bar{f}_{-(n-1)}\bar{f}_{-n}]}_{n=f}$$

$$\underbrace{[0 \ldots 00.\bar{f}_{-1} \ldots \bar{f}_{-(n-1)}\bar{f}_{-n}]}_{n-f} := \bar{f}$$

Consequently, the term $(1-f)$ can be implemented approximately by the complement of the data word f. The inverter 130 therefore forms the complement of the data word f. Thus, depending on the value of the data bit $f_{-1}$, either the data word f or the complement $\bar{f}$ of the constant $k1$ is multiplied by a multiplier 150. The inverter 130, the multiplexer 140, the multiplier 150 and the constant $k1$ (which is, for example, extracted from an appropriate register 160) thus implement the selection of $c1_a(x)$ and/or $c1_b(x)$ and the calculation of the correcting quantity $c_1$ (see formula (16)). The multiplier 150 can advantageously be designed as a shift-and-add structure for the multiplication by the constant $k1$.

$$f_{-1}=0 \rightarrow \text{Calculation of } cl_a(x)=k1 \cdot f \quad (16)$$

$$f_{-1}=1 \rightarrow \text{Calculation of } cl_b(x)=k1 \cdot \bar{f}$$

An assessment unit 170, which can be designed as an adder, for example, assesses or forms the sum from the data word k, the data word f and the result of the multiplication c1 and thereby assesses the first-order approximation for the Logarithmus Dualis of the input variable x. The result ld(x), which represents an estimate or approximate value s for the logarithm value of the input variable, is stored in a register 180 and output when required to a further processing unit which is not illustrated in FIG. 4.

Should a greater accuracy be required for the application, the method can proceed analogously using a further correction function.

Figure 5:
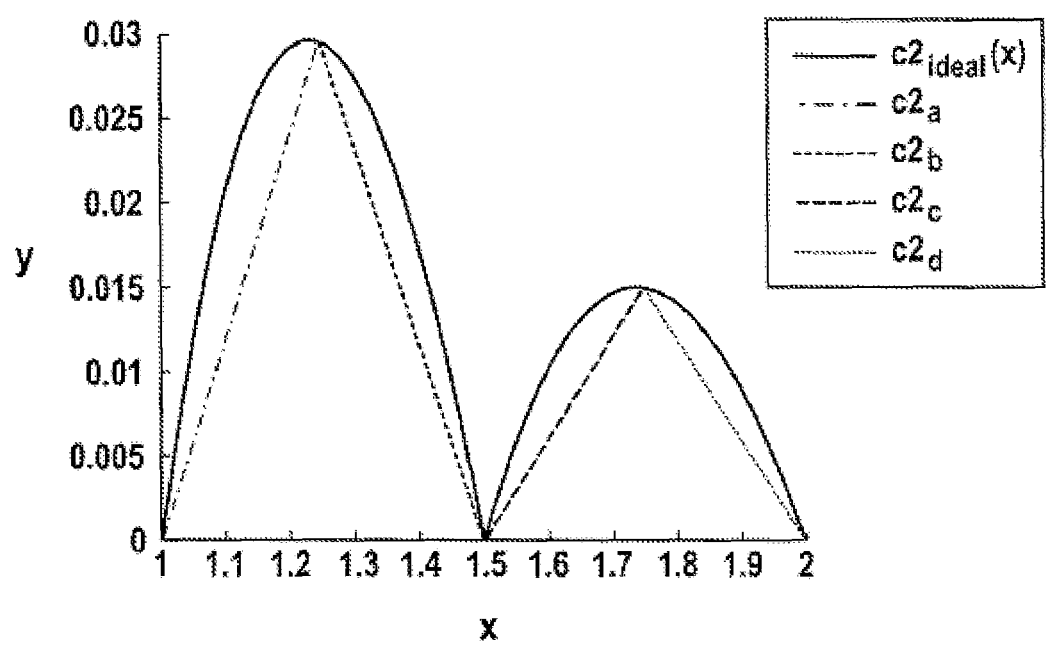
FIG. 5 shows a diagram which reproduces a profile of an ideal correction function relating to the second-order approximation; said correction function can be approximated by straight lines.

FIG. 5 shows a diagram which (with a designation of the axes corresponding to FIG. 1 or 2) reproduces a profile of the ideal correction function $c2_{ideal}(x)$, which is yielded from the error of the first-order approximation and the exact logarithm value of the input variable. In this case, FIG. 5 represents an ideal correction function $c2_{ideal}(x)$ and four straight lines $c2_a(x)$, $c2_b(x)$, $c2_c(x)$ and $c2_d(x)$ which are described in more detail below.

By comparison with the illustration for FIG. 2, $c2_{ideal}(x)$ does not have one region with a curve profile opening downward and resembling a parabola, instead $c2_{ideal}(x)$ has two regions with a curve profile opening downward and resembling a parabola. By analogy with the procedure described above, it is possible to approximate said ideal correction function with four straight lines (second-order approximation). The profile of the ideal correction function $c2_{ideal}(x)$ is approximated by two straight lines each in the region between two zero points. The two straight lines pass through one each of the zero points and intersect one another at a point on the ideal correction function $c2_{ideal}(x)$. The x-coordinate of the point of intersection is selected in the middle of the two zero points. The result is the straight lines $c2_a(x)$, $c2_b(x)$, $c2_c(x)$ and $c2_d(x)$, see equation (17).

$$c2_a(x)=4 \cdot c2_{ideal}(1.25) \cdot (x-1.00)=k2 \cdot (x-1.00) \text{ for } x \in [1.00,1.25)$$

$$c2_b(x)=4 \cdot c2_{ideal}(1.25) \cdot (1.50-x)=k2 \cdot (1.50-x) \text{ for } x \in [1.25,1.50)$$

$$c2_c(x)=4 \cdot c2_{ideal}(1.75) \cdot (x-1.50)=k3 \cdot (x-1.50) \text{ for } x \in [1.50,1.75)$$

$$c2_d(x)=4 \cdot c2_{ideal}(1.75) \cdot (2.00-x)=k3 \cdot (2.00-x) \text{ for } x \in [1.75,2.00) \quad (17)$$

The second-order approximation therefore runs:

$$ld(x) \approx m(x)+c1_a(x)+c2_a(x) \text{ for } x \in [1.00,1.25)$$

$$ld(x) \approx m(x)+c1_a(x)+c2_b(x) \text{ for } x \in [1.25,1.50)$$

$$ld(x) \approx m(x)+c1_b(x)+c2_c(x) \text{ for } x \in [1.50,1.75)$$

$$ld(x) \approx m(x)+c1_b(x)+c2_d(x) \text{ for } x \in [1.75,2.00) \quad (18)$$

Said method can be continued analogously for higher-order approximations. The correction functions for the first- (second-, third-, fourth-, . . . ) order approximations consist of one (two, 4, 8, . . . ) curves opening downward and resembling parabolas (corresponding to FIGS. 2 and 5). Said curves can respectively be approximated with twice the number of straight lines, that is to say the approximation takes place through two (4, 8, 16, . . . ) straight lines.

Figure 6:
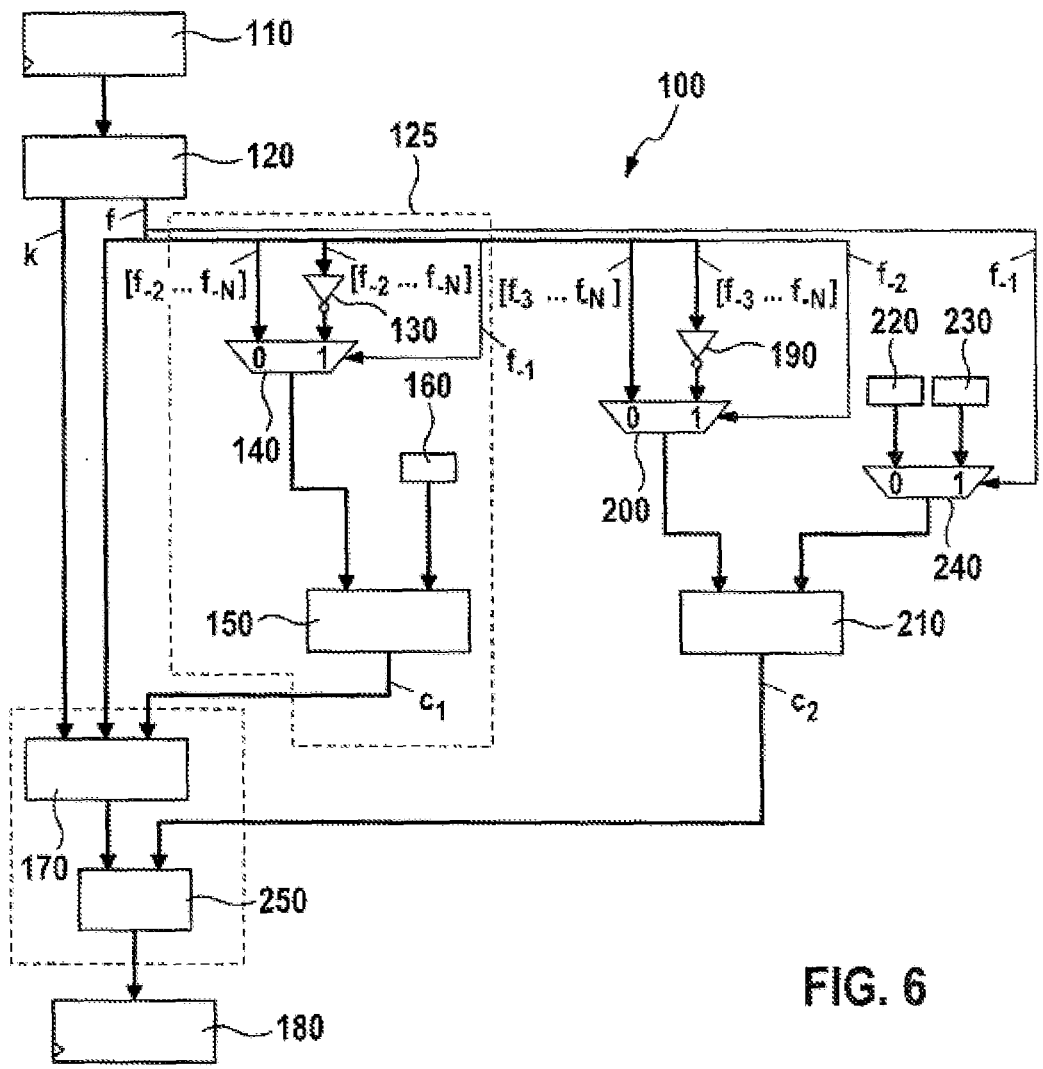
FIG. 6 shows a circuit diagram of a further exemplary embodiment of a device for determining an estimate of the logarithm of an input variable.

FIG. 6 illustrates a circuit diagram of a device 100 for determining estimates of the logarithm of an input variable with an exemplary embodiment of an arrangement for calculating the second-order approximation.

Supplementary to the units or blocks 110 to 180 from FIG. 4, which provide the first-order approximation, additional elements are present in FIG. 6. The correction term for the second-order approximation (which is also denoted as second correcting quantity) is added onto said first-order approximation. Said correction term is implemented by the blocks 190 to 240, which form an extension unit of the determination unit 125. The unit 250 forms an extension of the assessment unit 170 and can be assigned thereto logically.

The inverter 190 and the multiplexer 200 implement the terms (x−1.00), (1.50−x), (x−1.50) and (2.00−x) from formula (17) by analogy with the procedure for the first-order approximation. The selection of the correct constants for the multiplication (k2 or k3) is undertaken by the multiplexer 240 with the aid of the data bit $f_{-1}$.

The multiplier 210 multiplies the constant by the variable term and forms as a result the correction term c2, which is added on for the first-order approximation by the adder 250, in order to obtain the estimate or approximation value s of the logarithm of the input variable x. The combination of the first variable k, the second variable f as well as the first correcting quantity c1 and the second correcting quantity c2 can also take place in a single step or in a single unit, as the person skilled in the art will easily recognize from the circuitry and/or the description and with knowledge of the mathematical and algebraic laws. The result is stored in register 180 as an estimate or approximation value s of the logarithm of the input variable.

Figure 7:
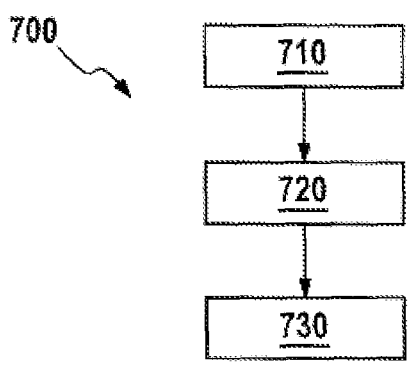
FIG. 7 shows a flowchart of an exemplary embodiment of the present disclosure as a method.

FIG. 7 shows a flowchart of an exemplary embodiment of the present disclosure as a method 700 for determining an estimate of the logarithm of an input variable. The method 700 comprises a step 710 of approximating a first variable from the input variable, the first variable corresponding to the integer component of the logarithmic value of the input variable, there being approximated a second variable which corresponds to an estimate of a non-integer component of the logarithmic value of the input variable. Furthermore, the method 700 comprises a step 720 of determining a correcting quantity by means of the second variable, and a step 730 of assessing the estimate s of the logarithm of the input variable by combining the first variable with the second variable and the correcting quantity.

The approach presented here can, for example, serve to implement the calculation of power functions (for example roots, powers $x^2$, $x^3$, ...) in ASICs in fixed point arithmetic cost effectively via logarithms. Such power functions occur, for example, in the temperature compensation of sensors and ASICs. Furthermore, logarithms can be used to check multipliers, dividers and root calculators for correct function during operation, which increases the safety in safety-critical applications (ISO 26262).

The exemplary embodiments described and shown in the figures have been selected only by way of example. Different exemplary embodiments can be combined with one another completely or with reference to individual features. It is also possible to supplement an exemplary embodiment with features of a further exemplary embodiment.

Furthermore, the method steps presented here can be repeated and be executed in a sequence other than in the sequence described.

If an exemplary embodiment comprises an "and/or" combination between a first feature and a second feature, this is to be read in the sense that the exemplary embodiment according to an embodiment has both the first feature and the second feature, and in accordance with a further embodiment has either only the first feature or only the second feature.

What is claimed is:

1. A device for determining an estimate of a logarithmic value of an input variable, the device comprising:
an approximation unit configured to (i) determine a first variable that corresponds to an estimate of an integer component of the logarithmic value of the input variable and (ii) determine a second variable that corresponds to an estimate of a non-integer component of the logarithmic value of the input variable;
a determination unit configured to determine a first correcting quantity based on the second variable, wherein the determination unit is configured to determine at least one second correcting quantity that is dependent on the second variable and the assessment unit is configured to assess the estimate of the logarithmic value of the input variable by combining the first variable with the second variable and at least one of the first correcting quantity and the at least one the second correcting quantity; and
an assessment unit configured to assess the estimate of the logarithmic value of the input variable by combining the first variable with the second variable and the first correcting quantity.

2. The device according to claim 1, wherein the approximation unit is configured to at least one of determine the first variable using a Mitchell approximation, determine the first variable using a base of two, and determine as the second variable a value between zero and one.

3. The device according to claim 1, wherein the determination unit is configured to determine the at least one second correcting quantity as a combination of a factor that depends on the second variable and at least one of a second constant and a third constant.

4. The device according to claim 1, wherein the determination unit is configured to determine the at least one second correcting quantity using at least one of a predetermined digit position of the second variable and a predetermined bit of the second variable, the predetermined digit position of the second variable representing the second most significant digit position of the second variable and the predetermined bit of the second variable representing the second most significant bit of the second variable.

5. The device according to claim 1, wherein the determination unit is configured to determine the at least one second correcting quantity as a function of a threshold decision using the second variable.

6. A signal processing device comprising:
a read in interface configured to read in a physical variable;
a device configured to determine an estimate of a logarithmic value of one of the physical variable and a value derived from the physical variable, the device comprising:
an approximation unit configured to (i) determine a first variable that corresponds to an estimate of an integer component of the logarithmic value of the input variable and (ii) determine a second variable that corresponds to an estimate of a non-integer component of the logarithmic value of the input variable;
a determination unit configured to determine a first correcting quantity based on the second variable, wherein the determination unit is configured to:
determine as the first correcting quantity a first term that is dependent on the second variable in response to the second variable being less than a threshold; and
determine as the first correcting quantity a second term that is dependent on the second variable in response to the second variable being greater than the threshold; and
an assessment unit configured to assess the estimate of the logarithmic value of the input variable by combining the first variable with the second variable and the first correcting quantity; and
at least one of a control unit and a signaling unit configured to provide at least one of a control signal and a data signal using the estimate.

7. A device for determining an estimate of a logarithmic value of an input variable, the device comprising:
an approximation unit configured to (i) determine a first variable that corresponds to an estimate of an integer component of the logarithmic value of the input variable and (ii) determine a second variable that corresponds to an estimate of a non-integer component of the logarithmic value of the input variable;

a determination unit configured to determine a first correcting quantity based on the second variable, wherein the determination unit is configured to determine the first correcting quantity by using a multiplication of a first constant by a factor that depends on the second variable, the factor being determined by using at least one of a multiplexer and an inverter; and an assessment unit configured to assess the estimate of the logarithmic value of the input variable by combining the first variable with the second variable and the first correcting quantity.

8. A device for determining an estimate of a logarithmic value of an input variable, the device comprising:

an approximation unit configured to (i) determine a first variable that corresponds to an estimate of an integer component of the logarithmic value of the input variable and (ii) determine a second variable that corresponds to an estimate of a non-integer component of the logarithmic value of the input variable;

a determination unit configured to determine a first correcting quantity based on the second variable, wherein the determination unit is configured to determine the first correcting quantity using at least one of a predetermined digit position of the second variable and a predetermined bit of the second variable, the predetermined digit position of the second variable representing the most significant digit position of the second variable and the predetermined bit of the second variable representing the most significant bit of the second variable; and an assessment unit configured to assess the estimate of the logarithmic value of the input variable by combining the first variable with the second variable and the first correcting quantity.

\* \* \* \* \*